(12) United States Patent
Chae et al.

(10) Patent No.: US 10,658,655 B2
(45) Date of Patent: May 19, 2020

(54) COPPER FOIL HAVING IMPROVED WORKABILITY AND CHARGE/DISCHARGE CHARACTERISTICS, ELECTRODE INCLUDING THE SAME, SECONDARY BATTERY INCLUDING THE SAME AND METHOD FOR MANUFACTURING THE SAME

(71) Applicant: KCF Technologies Co., Ltd., Anyang-si, Gyeonggi-do (KR)

(72) Inventors: Young Wook Chae, Anyang-si (KR); Young Hyun Kim, Anyang-si (KR); Shan Hua Jin, Anyang-si (KR)

(73) Assignee: KCF TECHNOLOGIES CO., LTD., Anyang-si, Gyeonggi-Do (KR)

(*) Notice: Subject to any disclaimer, the term of this patent is extended or adjusted under 35 U.S.C. 154(b) by 0 days.

(21) Appl. No.: 16/113,479

(22) Filed: Aug. 27, 2018

(65) Prior Publication Data
US 2019/0006658 A1   Jan. 3, 2019

(30) Foreign Application Priority Data
Jun. 28, 2017   (KR) .......................... 10-2017-0081571

(51) Int. Cl.
*H01M 4/66* (2006.01)
*H01M 4/134* (2010.01)
(Continued)

(52) U.S. Cl.
CPC .............. *H01M 4/134* (2013.01); *C25D 1/04* (2013.01); *C25D 3/38* (2013.01); *C25D 5/56* (2013.01);
(Continued)

(58) Field of Classification Search
CPC .. H01M 4/134; H01M 4/0402; H01M 4/0404; H01M 4/1395; H01M 4/661;
(Continued)

(56) References Cited

U.S. PATENT DOCUMENTS 8,557,392 B2 * 10/2013 Fujisawa ................. B32B 15/08
174/258
2006/0246314 A1 * 11/2006 Osada ..................... C22C 1/0475
428/675

(Continued)

FOREIGN PATENT DOCUMENTS

| CN | 105008593 A | 10/2015 |
| EP | 1748092 A1 | 1/2007 |

(Continued)

OTHER PUBLICATIONS

Taiwan Office Action for related Taiwan Application No. 107128078; dated Jun. 5, 2019; (9 pages).

(Continued)

*Primary Examiner* — Raymond Alejandro
(74) *Attorney, Agent, or Firm* — K&L Gates LLP

(57) ABSTRACT

Disclosed is a copper foil including a copper layer having a matte surface and a shiny surface, wherein the copper foil has a first surface of a direction of the matte surface of the copper layer and a second surface of a direction of the shiny surface of the copper layer, wherein a dynamic friction coefficient of the first surface is designated by μk1 and a dynamic friction coefficient of the second surface is designated by μk2. A ratio of three-dimensional surface area to two-dimensional surface area of the first surface is designated by Fs1, a ratio of three-dimensional surface area to two-dimensional surface area of the second surface is designated by Fs2.

8 Claims, 5 Drawing Sheets

(51) Int. Cl.
| | |
|---|---|
| *H01M 4/1395* | (2010.01) |
| *H01M 4/04* | (2006.01) |
| *C25D 3/38* | (2006.01) |
| *C25D 5/56* | (2006.01) |
| *C25D 1/04* | (2006.01) |
| *H01M 4/02* | (2006.01) |
| *H01M 10/0525* | (2010.01) |
| *H01M 4/133* | (2010.01) |
| *H01M 4/36* | (2006.01) |

(52) U.S. Cl.
CPC ....... *H01M 4/0402* (2013.01); *H01M 4/0404* (2013.01); *H01M 4/1395* (2013.01); *H01M 4/661* (2013.01); *H01M 4/667* (2013.01); *H01M 4/668* (2013.01); *H01M 4/133* (2013.01); *H01M 4/364* (2013.01); *H01M 10/0525* (2013.01); *H01M 2004/027* (2013.01)

(58) Field of Classification Search
CPC ...... H01M 4/667; H01M 4/668; H01M 4/133; H01M 4/364; H01M 10/0525; H01M 2004/027; C25D 1/04; C25D 3/38; C25D 5/56

See application file for complete search history.

(56) References Cited

U.S. PATENT DOCUMENTS

| | | | |
|---|---|---|---|
| 2014/0199588 A1 | 7/2014 | Shinozaki | |
| 2016/0115277 A1* | 4/2016 | Fang | C08G 73/1078 428/458 |
| 2016/0260980 A1 | 9/2016 | Lee et al. | |
| 2016/0374208 A1* | 12/2016 | Chiang | C09D 179/08 |

FOREIGN PATENT DOCUMENTS

| | | |
|---|---|---|
| JP | 2008101267 A | 5/2008 |
| JP | 2012172195 A | 9/2012 |
| JP | 2016537514 A | 12/2016 |
| JP | 2017076618 A | 4/2017 |
| KR | 20150041577 A | 4/2015 |
| KR | 20150062230 A | 6/2015 |
| KR | 10-2015-0021473 | 3/2016 |
| KR | 10-2016-0138321 | 10/2016 |
| KR | 1020170046632 | 6/2017 |
| KR | 20180054985 A | 5/2018 |
| KR | 20190001677 A | 1/2019 |
| KR | 20190030987 A | 3/2019 |
| TW | 201700739 A | 1/2017 |
| WO | 2015/104999 A1 | 7/2015 |

OTHER PUBLICATIONS

European Search Report for related European Application No. 18188418.0; dated Oct. 24, 2018; (7 pages).
Japanese Office Action for related Japanese Application No. 2018-153122; dated Oct. 1, 2019; (5 pages).
Korean Office Action for related Korean Application No. 10-2017-0081571; action dated Feb. 27, 2020; (6 pages).

* cited by examiner

COPPER FOIL HAVING IMPROVED WORKABILITY AND CHARGE/DISCHARGE CHARACTERISTICS, ELECTRODE INCLUDING THE SAME, SECONDARY BATTERY INCLUDING THE SAME AND METHOD FOR MANUFACTURING THE SAME

CROSS-REFERENCE TO RELATED APPLICATION

Pursuant to 35 U.S.C. § 119(a), this application claims the benefit of earlier filing date and right of priority to Korean Application No. 10-2017-0081571, filed on Jun. 28, 2017, in the Korean Intellectual Property Office, the disclosure of which is hereby incorporated by reference in its entirety.

BACKGROUND OF THE DISCLOSURE

Field of the Disclosure

The present disclosure relates to a copper foil having improved workability and charge/discharge characteristics, an electrode including the same, a secondary battery including the same, and a method for manufacturing the same.

Description of the Related Art

Copper foils are used to manufacture a variety of products such as anodes for secondary batteries and flexible printed circuit boards (FPCBs).

In particular, a copper foil formed by electroplating is referred to as an "electrolytic copper foil". Such an electrolytic copper foil is manufactured by a roll-to-roll (RTR) process and is used to manufacture anodes for secondary batteries and flexible printed circuit boards (FPCBs) via an RTR process. The RTR process is known to be suitable for mass-production.

In general, an electrolytic copper foil is produced by a roll-to-roll process with a foil making machine and coating an active material in the process of manufacturing a secondary battery is also proceeded by the roll-to-roll process. Recently, in an attempt to increase the capacity of secondary batteries, an ultra-slim copper foil is used. When the copper foil has a thin thickness of about 10 μm or less, the phenomenon of slip frequently occurs between the roll and the copper foil. The frequent slip results in bagginess and tear of the copper foil, which makes it impossible to conduct a continuous process and thus causes a deterioration in workability or handleability. In serious cases, it is impossible to manufacture electrodes.

Accordingly, there is a need for suppressing slip of copper foils, and preventing or suppressing bagginess or tear of copper foils.

SUMMARY OF THE DISCLOSURE

Therefore, the present disclosure has been made in view of the above problems, and it is one object of the present disclosure to provide a copper foil, an electrode including the same, a secondary battery including the same, and a method for manufacturing the same.

It is another object of the present disclosure to provide a copper foil that is capable of preventing slip and thus minimizing bagginess or tear. In particular, it is another object of the present disclosure to provide a copper foil that is capable of preventing occurrence of slip in the manufacturing process in spite of thin thickness and thus providing excellent roll-to-roll (RTR) processability.

It is another object of the present disclosure to provide an electrode for secondary batteries including the copper foil and a secondary battery that includes the electrode for secondary batteries and thus has excellent capacity maintenance.

It is another object of the present disclosure to provide a flexible copper foil laminate film including the copper foil.

It is another object of the present disclosure to provide a method for manufacturing a copper foil that is capable of preventing slip and thus minimizing occurrence of bagginess or tear.

Apart from the aspects of the present disclosure mentioned above, other features and advantages of the present disclosure will be described below and would be clearly understood from the description by those skilled in the art.

The present inventors found that slip of the copper foil closely relates to the dynamic friction coefficient of the copper foil and the difference in surface area ratio between two surfaces of the copper foil, and as the difference in surface area ratio between two surfaces of the copper foil increases, the differences in amount and uniformity of the active material coated on two surfaces of the copper foil increase, which may cause deterioration in charge/discharge efficiency of the secondary battery. In addition, the present inventors found that the dynamic friction coefficient and surface area ratio of a surface at the direction of the matte surface can be controlled by controlling an additive in the process of manufacturing the copper foil and the dynamic friction coefficient and surface area ratio of a surface at the direction of the shiny surface can be controlled by adjusting roughness of a buffing brush.

Accordingly, according to the present disclosure, workability and charge/discharge characteristics of the copper foil are improved by controlling both the dynamic friction coefficient and the surface area ratio of the copper foil.

In accordance with the present disclosure, the above and other objects can be accomplished by the provision of a copper foil including a copper layer having a matte surface and a shiny surface, wherein the copper foil has a first surface of a direction of the matte surface of the copper layer and a second surface of a direction of the shiny surface of the copper layer, wherein a dynamic friction coefficient of the first surface is designated by μk1 and a dynamic friction coefficient of the second surface is designated by μk2, and μk1 and μk2 satisfy the following Equations 1 and 2:

$$0.4 \leq \mu k1 \leq 0.5 \quad \text{[Equation 1]}$$

$$|\mu k1 - \mu k2| \leq 0.2 \quad \text{[Equation 2]}$$

a ratio of three-dimensional surface area to two-dimensional surface area of the first surface is designated by Fs1, a ratio of three-dimensional surface area to two-dimensional surface area of the second surface is designated by Fs2, and Fs1 and Fs2 satisfy the following Equations 3 and 4:

$$4.0 \leq Fs1 \leq 6.5 \quad \text{[Equation 3]}$$

$$|Fs1 - Fs2| \leq 2.0 \quad \text{[Equation 4]}$$

The copper foil may have a tensile strength of 40 kgf/mm$^2$ or more at room temperature.

The copper foil may have a thickness of 4 μm to 35 μm.

The copper foil may further include an anticorrosive film disposed on the copper layer.

The anticorrosive film may include at least one of chromium (Cr), a silane compound or a nitrogen compound.

In accordance with another aspect of the present disclosure, there is provided an electrode for secondary batteries including the copper foil according to the present disclosure and an active material layer disposed on the copper foil.

In accordance with another aspect of the present disclosure, there is provided a secondary battery including a cathode, an anode facing the cathode, an electrolyte disposed between the cathode and the anode to provide an environment enabling lithium ions to move, and a separator to electrically insulate (isolate) the cathode from the anode, wherein the anode includes the copper foil according to the present disclosure and an active material layer disposed on the copper foil.

In accordance with another aspect of the present disclosure, there is provided a flexible copper foil laminate film including a polymer membrane, and the copper foil according to the present disclosure disposed on the polymer membrane.

In accordance with another aspect of the present disclosure, there is provided a method for manufacturing a copper foil including applying a current density of 30 to 80 ASD (A/dm$^2$) to an electrode plate and a rotary electrode drum spaced from each other in an electrolyte containing copper ions to form a copper layer, wherein the electrolyte includes 60 to 120 g/L of copper ions, 80 to 150 g/L of sulfuric acid, 50 mg/L or less of chlorine (Cl) and an organic additive, wherein the organic additive contains at least one of 3 to 100 mg/L of ingredient A and 5 to 50 mg/L of ingredient B, and 1 to 20 mg/L of ingredient C, wherein the ingredient A is sulfonic acid or a metal salt thereof, the ingredient B is a nonionic water-soluble polymer, and the ingredient C is a heterocyclic organic compound containing nitrogen (N) or sulfur (S).

The ingredient A includes at least one selected from a bis-(3-sulfopropyl)-disulfide disodium salt (SPS), 3-mercapto-1-propanesulfonic acid, a 3-(N,N-dimethylthiocarbamoyl)-thiopropanesulfonate sodium salt, a 3-[(amino-iminomethyl)thio]-1-propanesulfonate sodium salt, an o-ethyldithiocarbonato-S-(3-sulfopropyl)-ester sodium salt, a 3-(benzothiazolyl-2-mercapto)-propyl-sulfonic acid sodium salt and an ethylenedithiodipropylsulfonic acid sodium salt.

The ingredient B includes at least one selected from polyethylene glycol (PEG), polypropylene glycol, a polyethylenepolypropylene copolymer, polyglycerin, polyethylene glycol dimethyl ether, hydroxyethylene cellulose, polyvinyl alcohol, stearic acid polyglycol ether and stearyl alcohol polyglycol ether.

The ingredient B has a molecular weight of 500 to 25,000.

The ingredient C includes at least one selected from 2-mercaptobenzothiazole (2MBT), 3-(benzotriazole-2-mercapto)-pyrosulfuric acid, 2-mercaptopyridine, 3-(5-mercapto-1H-tetrazole)benzenesulfonate, 2-mercaptobenzothiazole, dimethylpyridine, 2,2'-bipyridine, 4,4'-bipyridine, pyrimidine, pyridazine, pyrinoline, oxazole, thiazole, 1-methylimidazole, 1-benzylimidazole, 1-methyl-2-methylimidazole, 1-benzyl-2-methylimidazole, 1-ethyl-4-methylimidazole, N-methylpyrrole, N-ethylpyrrole, N-butylpyrrole, N-methylpyrroline, N-ethylpyrroline, N-butylpyrroline, purine, quinoline, isoquinoline, N-methylcarbazole, N-ethylcarbazole and N-butylcarbazole.

The method may further include forming an anticorrosive film on the copper layer.

The general description of the present disclosure given above is provided only for illustration or description of the present disclosure and should not be construed as limiting the scope of the present disclosure.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1:
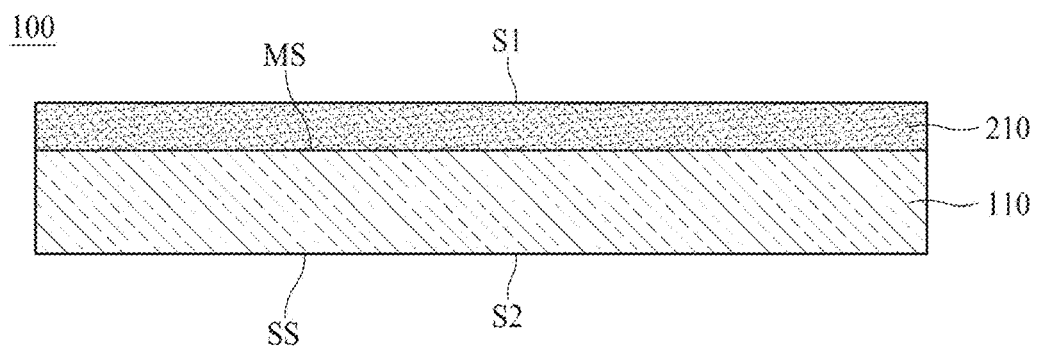
FIG. 1 is a schematic sectional view illustrating a copper foil according to an embodiment of the present disclosure.

Reference will now be made in detail to the preferred embodiments of the present disclosure, examples of which are illustrated in the accompanying drawings.

Those skilled in the art will appreciate that various modifications, additions and substitutions are possible, without departing from the scope and spirit of the disclosure as disclosed in the accompanying claims. Accordingly, the present disclosure encompasses the disclosure defined in claims and modifications and alterations that fall within the scope of the equivalents thereto.

The shapes, sizes, ratios, angles and numbers disclosed in the drawings for describing embodiments of the present disclosure are merely examples, and thus the present disclosure is not limited to the illustrated details. Like reference numerals refer to like elements throughout the specification.

In the case in which "comprise," "have," and "include" described in the present specification are used, another part may also be present unless "only" is used. The terms in a singular form may include plural forms unless noted to the contrary. In construing an element, the element is construed as including an error region although there is no explicit description thereof.

In describing a positional relationship, for example, when the positional order is described as "on," "above," "below," and "next,", at least another part may be present between two parts, unless "just" or "direct" is used.

In describing a temporal relationship, for example, when the temporal order is described as "after," "subsequent," "next," and "before," a case which is not continuous may be included, unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It should be understood that the term "at least one" includes all combinations related with one or more items.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in a co-dependent relationship.

FIG. 1 is a schematic sectional view illustrating a copper foil 100 according to an embodiment of the present disclosure.

The copper foil 100 according to the embodiment of the present disclosure includes a copper layer 110. The copper layer 110 has a matte surface MS and a shiny surface SS opposite to the matte surface MS.

Figure 7:
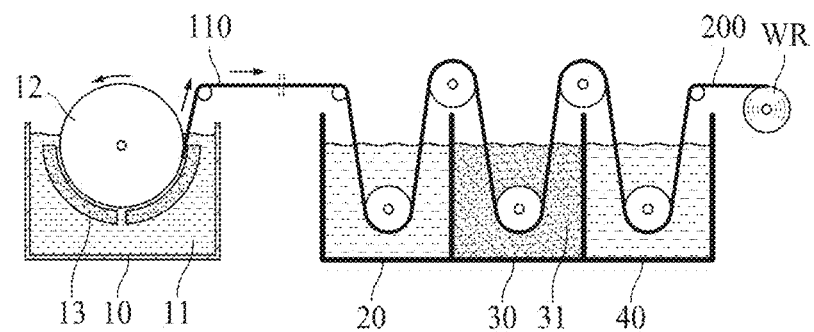
FIG. 7 is a schematic view illustrating a method for manufacturing the copper foil shown in FIG. 2.

The copper layer 110 may be, for example, formed on a rotary electrode drum by electroplating (see FIG. 7). At this time, the shiny surface SS refers to a surface of the copper layer 110 which contacts the rotary electrode drum during electroplating and the matte surface MS refers to a surface which is disposed opposite to the shiny surface SS.

The shiny surface SS generally has a lower surface roughness Rz than that of the matte surface MS, but the embodiment of the present disclosure is not limited thereto. The surface roughness Rz of the shiny surface SS may be equal to or higher than the surface roughness Rz of the matte surface MS.

Referring to FIG. 1, the copper foil 100 further includes an anticorrosive film 210 disposed on the copper layer 110. The anticorrosive film 210 may be omitted as well.

The anticorrosive film 210 may be disposed on at least one of the matte surface MS or the shiny surface SS of the copper layer 110. Referring to FIG. 1, the anticorrosive film 210 is disposed on the matte surface MS, but the embodiments of the present disclosure are not limited thereto. That is, the anticorrosive film 210 may be disposed only on the shiny surface SS, or both on the matte surface MS and the shiny surface SS.

The anticorrosive film 210 protects the copper layer 110 to prevent the copper layer 110 from being oxidized or denatured upon storage or distribution. Accordingly, the anticorrosive film 210 is also called a "protective layer".

According to an embodiment of the present disclosure, the anticorrosive film 210 may include at least one of chromium (Cr), a silane compound or a nitrogen compound.

For example, the anticorrosive film 210 may be prepared from a chromium (Cr)-containing anticorrosive liquid, that is, a chromate compound-containing anticorrosive liquid.

According to an embodiment of the present disclosure, the copper foil 100 has a first surface S1 which corresponds to a surface of the direction of the matte surface MS based on the copper layer 110 and a second surface S2 which corresponds to a surface of the direction of the shiny surface SS. Referring to FIG. 1, the first surface S1 of the copper foil 100 is a surface of the anticorrosive film 210 and the second surface S2 thereof is a shiny surface SS. According to one embodiment of the present disclosure, the anticorrosive film 210 may be omitted. When the anticorrosive film 210 is omitted, the matte surface MS of the copper layer 110 corresponds to the first surface S1 of the copper foil 100.

According to one embodiment of the present disclosure, the first surface S1 and the second surface S2 of the copper foil 100 each have a dynamic friction coefficient ($\mu k$).

Specifically, the dynamic friction coefficient of the first surface S1 of the copper foil 100 is designated by $\mu k1$ and the dynamic friction coefficient of the second surface S2 is designated by $\mu k2$. In this case, $\mu k1$ and $\mu k2$ satisfy the following Equations 1 and 2:

$$0.4 \leq \mu k1 \leq 0.5 \qquad \text{[Equation 1]}$$

$$|\mu k1 - \mu k2| \leq 0.2 \qquad \text{[Equation 2]}$$

That is, the first surface S1 of the copper foil 100 has a dynamic friction coefficient ($\mu k1$) of 0.4 to 0.5 and the difference in dynamic friction coefficient between the first surface S1 and the second surface S2 is 0.2 or less.

The dynamic friction coefficient of the copper foil 100 can be measured using Tribogear 14FW available from Haydon Corporation, Inc. in accordance with the regulations of ASTM D1894. Specifically, a stainless steel ball (SUS ball) is brought into contact with the copper foil 100 and they are mutually moved while a load is applied to the stainless steel (SUS) ball, so that the dynamic friction coefficient of the copper foil 100 can be measured. In this case, the dynamic friction coefficient of the copper foil 100 can be measured at a rate of 100 mm/min using a 10 mm (diameter) stainless steel ball (SUS ball) at a measurement distance of 10 mm and an applied load of 100 g. The dynamic friction coefficient is measured three times and the mean thereof is used.

When the dynamic friction coefficient ($\mu k1$) of the first surface S1 of the copper foil 100 is less than 0.4, in the process of manufacturing the copper foil 100 or other product, for example, a secondary battery, using the copper foil 100 by a roll-to-roll (RTR) process, slip occurs, thus causing the copper foil 100 to be wrinkled.

On the other hand, when the dynamic friction coefficient ($\mu k1$) of the first surface S1 of the copper foil 100 is higher than 0.5, slip can be prevented or suppressed, but the surface of the copper foil 100 is excessively rough, and, for example, in the process of manufacturing an electrode for secondary batteries, the copper foil 100 may be non-uniformly coated with an active material.

Meanwhile, when the difference in dynamic friction coefficient between the first surface S1 and the second surface S2 of the copper foil 100 is higher than 0.2, the differences in surface characteristics between two surfaces of the copper foil 100 are great, which may cause the two surfaces of the copper foil 100 to be differently coated with an active material in the process of manufacturing an electrode for secondary batteries. Accordingly, the difference in dynamic friction coefficient between the first surface S1 and the second surface S2 of the copper foil 100 is adjusted to 0.2 or less.

The dynamic friction coefficient ($\mu k1$) of the first surface S1 of the copper foil 100 can be controlled by controlling an additive in the process of manufacturing the copper layer 110. In addition, the dynamic friction coefficient ($\mu k2$) of the second surface S2 of the copper foil can be controlled by controlling the grit (roughness) of a brush used for buffing (polishing) the surface of a rotary electrode drum in the process of manufacturing the copper layer 110 (see FIG. 7).

The second surface S2 of the copper foil may have a dynamic friction coefficient ($\mu k2$) of 0.2 to 0.7.

In addition, the first surface S1 and the second surface S2 of the copper foil 100 each have a ratio of three-dimensional surface area to two-dimensional surface area (Fs).

Specifically, the ratio of three-dimensional surface area to two-dimensional surface area, for the first surface S1 of the copper foil 100, is designated by Fs1 and the ratio of three-dimensional surface area to two-dimensional surface area of the second surface S2 is designated by Fs2, wherein Fs1 and Fs2 satisfy the following Equations 3 and 4:

$$4.0 \leq Fs1 \leq 6.5 \quad \text{[Equation 3]}$$

$$|Fs1 - Fs2| \leq 2.0 \quad \text{[Equation 4]}$$

In the present disclosure, "ratio of three-dimensional surface area to two-dimensional surface area (Fs)" may be also simply referred to as "surface area ratio" or designated by "Fs".

The ratio of three-dimensional surface area to two-dimensional surface area (Fs) can be measured with a three dimensional (3D) microscope. For example, the ratio of three-dimensional surface area to two-dimensional surface area (Fs) can be measured using VK-9710, as a color 3D laser microscope, available from Keyence Corporation. At this time, the magnification is 50× and the sample size of the copper foil 100 is 1 cm×1 cm.

Specifically, the copper foil 100 is cut to a size of 1 cm×1 cm to produce a sample and the copper foil sample is observed at a magnification of 50× using VK-9710 as a color 3D laser microscope, available from Keyence Corporation to measure a three-dimensional surface area. The ratio of three-dimensional surface area to two-dimensional surface area (Fs) corresponds to a value which is obtained by dividing a three-dimensional surface area of the corresponding copper foil sample three-dimensionally measured, by a two-dimensional planar surface area (1 cm$^2$) of the corresponding copper foil sample. Here, the real surface area is a three-dimensional surface area which is obtained by moving a lens of the microscope along the Z-axis and adjusting the focus.

According to one embodiment of the present disclosure, the ratio of three-dimensional surface area to two-dimensional surface area (Fs) can be obtained by the following Equation 5:

$$Fs = \frac{\text{Three-dimensional surface area of sample}}{\text{Two-dimensional planar surface area of sample}} \quad \text{[Equation 5]}$$

When the ratio of three-dimensional surface area to two-dimensional surface area of the first surface S1, "Fs1", of the copper foil 100 is less than 4.0, the surface of the copper foil 100 is excessively flat, and the active material can be readily detached from the copper foil 100 in an anode for secondary batteries using the copper foil 100.

When the ratio of three-dimensional surface area to two-dimensional surface area of the first surface S1, "Fs1", of the copper foil 100 is higher than 6.5, the first surface S1 of the copper foil 100 is excessively rough and, in the process of manufacturing an anode for secondary batteries using the copper foil 100, the copper foil 100 may be non-uniformly coated with an active material, thus causing deterioration in charge/discharge efficiency of secondary batteries.

In addition, when the difference in the ratio of three-dimensional surface area to two-dimensional surface area between the first surface S1 and the second surface S2 of the copper foil 100 is higher than 2.0, the difference in contact surface area between the first surface S1 and the second surface S2 of the copper foil 100 becomes great, which causes an increase in the difference in coating amount of active material between both surfaces of the copper foil 100 and deterioration in charge/discharge efficiency of secondary batteries.

According to an embodiment of the present disclosure, the copper foil 100 has a tensile strength of 40 kgf/mm$^2$ or more at room temperature (25±15° C.). The tensile strength may be measured with a universal testing machine (UTM) in accordance with the regulations of the IPC-TM-650 test method manual. According to an embodiment of the present disclosure, tensile strength is measured with a universal testing machine available from Instron corporation. At this time, the width of a sample for measuring tensile strength is 12.7 mm, the distance between grips is 50 mm and measurement speed is 50 mm/min.

High-capacity active materials used for high-capacity secondary batteries undergo great volume expansion during charge/discharge. Accordingly, a copper foil 100 with a high tensile strength that can respond to volume expansion of high-capacity active materials is preferably used as a current collect for electrodes for high-capacity secondary batteries. That is, the copper foil 100 used as a current collector receives a stress due to expansion and shrinkage of active materials that occur upon charge/discharge of electrodes. When the tensile strength of the copper foil 100 is less than 40 kgf/mm$^2$, the copper foil does not withstand such stress, thus causing the copper foil 100 to be wrinkled, deformed or broken. In order to prevent this phenomenon, the copper foil 100 according to one embodiment has a tensile strength of 40 kgf/mm$^2$ or more.

Meanwhile, when the tensile strength of the copper foil 100 is excessively high, the copper foil 100 becomes more brittle and thus does not extend in response to force applied locally to the copper foil 100 during a roll-to-roll process, thus causing the copper foil 100 to be torn. For example, in the process of producing the copper foil or in the process of producing an electrode for secondary batteries using the copper foil, a tear may occur, which may make it difficult to stably obtain products. Thus, the tensile strength of the copper foil 100 can be adjusted to 65 kgf/mm$^2$ or less.

According to one embodiment of the present disclosure, the copper foil 100 has an elongation of 2% or more at room temperature of 25±15° C. The elongation can be measured using a universal testing machine (UTM) in accordance with the regulations of the IPC-TM-650 test method manual. According to one embodiment of the present disclosure, the equipment available from Instron corporation may be used. At this time, the width of a sample for measuring tensile strength is 12.7 mm, the distance between grips is 50 mm and measurement speed is 50 mm/min.

When the elongation of the copper foil 100 is less than 2%, the copper foil 100 does not sufficiently extend in response to volume expansion of the high-capacity active material used for high-capacity secondary batteries and may thus be torn.

More specifically, the copper foil 100 may have an elongation of 2 to 10%.

According to an embodiment of the present disclosure, the copper foil 100 may have a thickness of 4 μm to 35 μm. When the thickness of the copper foil 100 is less than 4 μm, workability is deteriorated in the process of manufacturing an electrode for secondary batteries or a secondary battery using the copper foil 100. When the thickness of the copper foil 100 is higher than 35 μm, the thickness of the electrode for secondary batteries using the copper foil 100 is increased and there is a difficulty in realizing high capacity secondary batteries due to the thickness.

Figure 2:
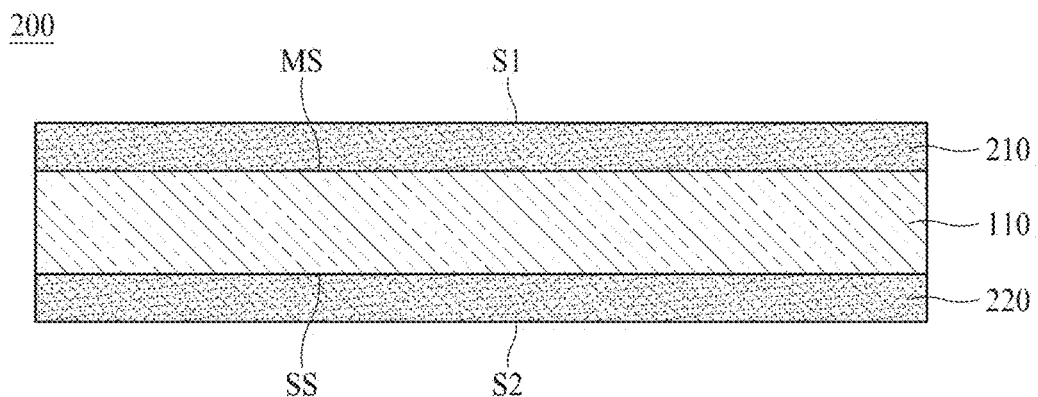
FIG. 2 is a schematic sectional view illustrating a copper foil according to another embodiment of the present disclosure.

FIG. 2 is a schematic sectional view illustrating a copper foil 200 according to another embodiment of the present disclosure. Hereinafter, description of constituent components given above will be omitted to avoid repetition.

Referring to FIG. 2, the copper foil 200 according to another embodiment of the present disclosure includes a copper layer 110, and two anticorrosive films 210 and 220 each disposed on the matte surface MS and the shiny surface SS of the copper layer 110. Compared with the copper foil 100 shown in FIG. 1, the copper foil 200 shown in FIG. 2 further includes an anticorrosive film 220 disposed on the shiny surface SS of the copper layer 110.

For convenience of description, the anticorrosive film 210 disposed on the matte surface MS of the copper layer 110, among two anticorrosive films 210 and 220, is referred to as a "first protective layer" and the anticorrosive film 220 disposed on the shiny surface SS is referred to as a "second protective layer".

In addition, the copper foil 200 shown in FIG. 2 has a first surface S1 which is a surface of a direction of the matte surface MS, based on the copper layer 110 and a second surface S2 which is a surface of a direction of the shiny surface SS. In this case, the first surface S1 of the copper foil 200 shown in FIG. 2 is the surface of the anticorrosive film 210 disposed on the matte surface MS, and the second surface S2 is the surface of the anticorrosive film 220 disposed on the shiny surface SS.

According to another embodiment of the present disclosure, each of two anticorrosive films 210 and 220 may include at least one of chromium (Cr), a silane compound or a nitrogen compound.

Regarding the copper foil 200 according to another embodiment of the present disclosure, a dynamic friction coefficient (μk1) of the first surface S1 is 0.4 to 0.5 and a difference in dynamic friction coefficient between the first surface S1 and the second surface S2 is 0.2 or less.

In addition, the ratio of three-dimensional surface area to two-dimensional surface area (Fs1) of the first surface S1 of the copper foil 200 is 4.0 to 6.5 and a difference in ratio of three-dimensional surface area to two-dimensional surface area between the first surface S1 and the second surface S2 is 2.0 or less.

According to another embodiment of the present disclosure, the copper foil 200 has a tensile strength of 40 kgf/mm2 or more at room temperature of 23±15° C., an elongation of 2% or more and a thickness of 4 μm to 35 μm.

Figure 3:
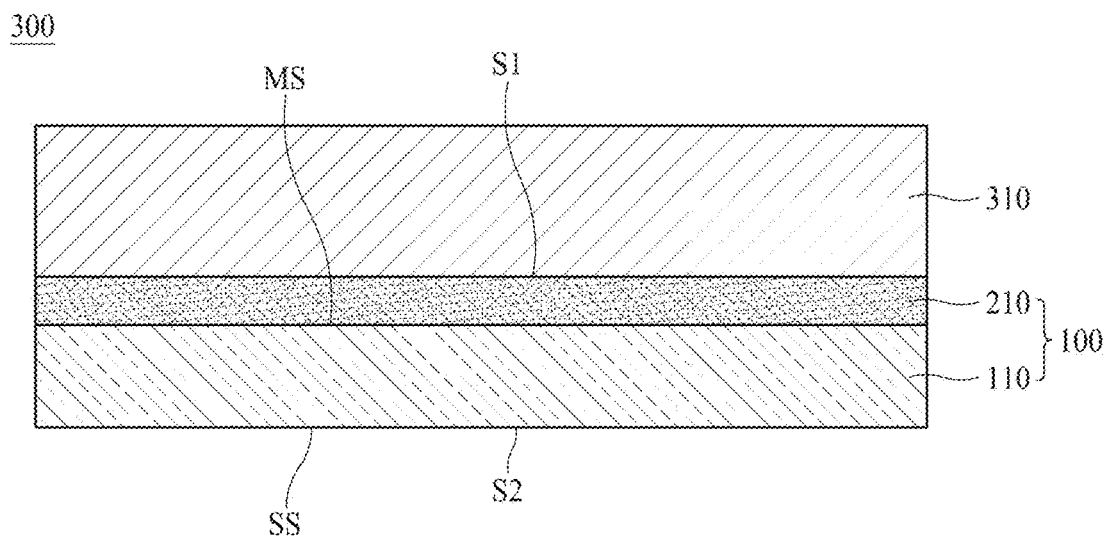
FIG. 3 is a schematic sectional view illustrating an electrode for secondary batteries according to another embodiment of the present disclosure.

FIG. 3 is a schematic sectional view illustrating an electrode 300 for secondary batteries according to another embodiment of the present disclosure.

Figure 5:
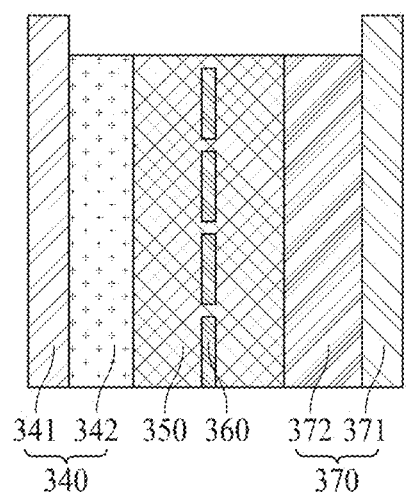
FIG. 5 is a schematic sectional view illustrating a secondary battery according to another embodiment of the present disclosure.

The electrode 300 for secondary batteries shown in FIG. 3 may be, for example, applied to the secondary battery 500 shown in FIG. 5.

Referring to FIG. 3, the electrode 300 for secondary batteries according to another embodiment of the present disclosure includes a copper foil 100 and an active material layer 310 disposed on the copper foil 100. In this case, the copper foil 100 is used as a current collector.

Specifically, the copper foil 100 has a first surface S1 and a second surface S2, and an active material layer 310 is disposed on at least one of the first surface S1 or the second surface S2 of the copper foil 100. In addition, the active material layer 310 may be disposed on an anticorrosive film 210.

FIG. 3 shows that the copper foil 100 shown in FIG. 1 is used as a current collector. However, the one embodiment of the present disclosure is not limited thereto and the copper foil 200 shown in FIG. 2 may be used as a current collector of the electrode 300 for secondary batteries.

In addition, the configuration in which the active material layer 310 is disposed only on the first surface S1 of the copper foil 100 is illustrated in FIG. 3, but other embodiments of the present disclosure are not limited thereto. The active material layer 310 may be disposed on both the first surface S1 and the second surface S2 of the copper foil 100, or on only the second surface S2 of the copper foil 100.

The active material layer 310 shown in FIG. 3 includes an electrode active material, in particular, an anode active material. That is, the electrode 300 for secondary batteries shown in FIG. 3 may be used as an anode.

The active material layer 310 may include at least one of carbon, a metal, a metal oxide, or a composite of a metal and carbon. The metal may include at least one of Ge, Sn, Li, Zn, Mg, Cd, Ce, Ni or Fe. In addition, in order to increase charge/discharge capacity of secondary batteries, the active material layer 310 may include silicon (Si).

The repeated charge/discharge of secondary batteries causes the active material layer 310 to be alternately expanded and shrunken, which results in separation of the active material layer 310 and the copper foil 100, and deterioration in charge/discharge efficiencies of the secondary battery. In particular, the active material layer 310 including silicon (Si) undergoes great expansion and shrinkage.

According to another embodiment of the present disclosure, the copper foil 100 used as a current collector can shrink and expand in response to shrinkage and expansion of the active material layer 310 and thus is neither deformed nor torn, although the active material layer 310 is shrunken and expanded. As a result, the separation between the copper foil 100 and the active material layer 310 does not occur. Hence, a secondary battery including the electrode 2300 for secondary batteries has excellent charge/discharge efficiency and superior capacity maintenance rate.

Figure 4:
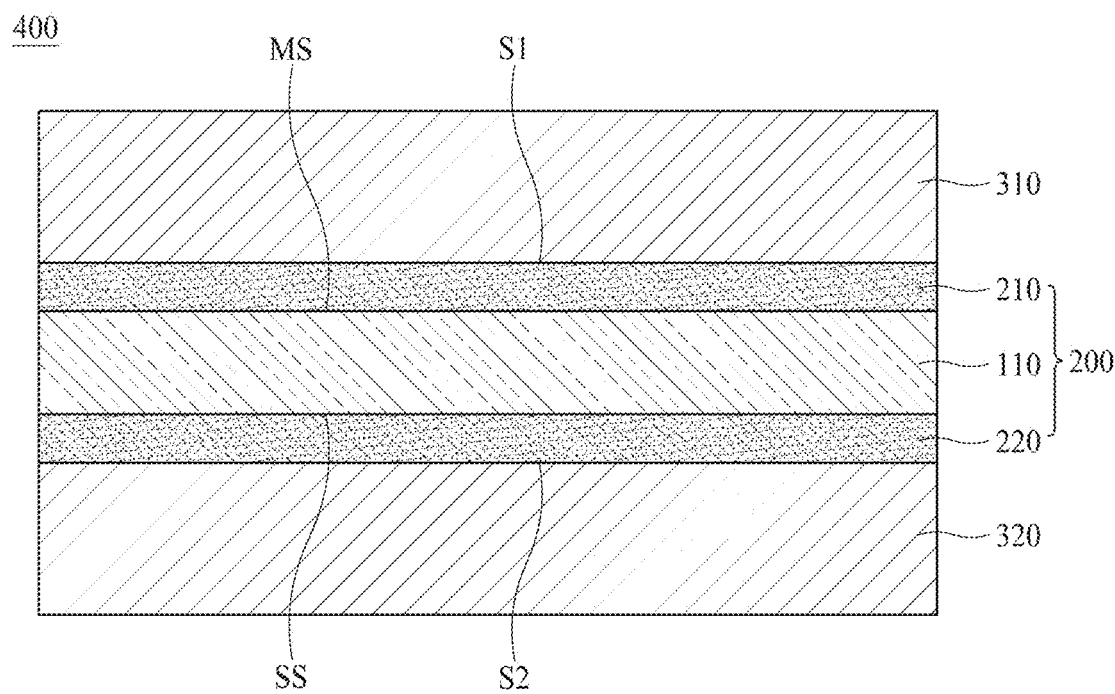
FIG. 4 is a schematic sectional view illustrating an electrode for secondary batteries according to another embodiment of the present disclosure.

FIG. 4 is a schematic sectional view illustrating an electrode 400 for secondary batteries according to another embodiment of the present disclosure.

The electrode 400 for secondary batteries according to another embodiment of the present disclosure includes a copper foil 200, and active material layers 310 and 320 disposed on the copper foil 200. The copper foil 200 includes a copper layer 110, and anticorrosive films 210 and 220 disposed on opposite surfaces MS and SS of the copper layer 110.

Specifically, the electrode 300 for secondary batteries shown in FIG. 4 includes two active material layers 310 and 320 disposed on the first surface S1 and the second surface S2 of the copper foil 200. Here, the active material layer 310 disposed on the first surface S1 of the copper foil 200 is referred to as a "first active material layer" 310 and the active material layer 320 disposed on the second surface S2 of the copper foil 200 is referred to as a "second active material layer" 320.

The two active material layers 310 and 320 can be produced in the same manner and using the same material, or in a different manner and using a different material.

FIG. 5 is a schematic sectional view illustrating a secondary battery 500 according to another embodiment of the present disclosure. The secondary battery 500 shown in FIG. 5 is, for example, a lithium secondary battery.

Referring to FIG. 5, the secondary battery 500 includes a cathode 370, an anode 340 facing the cathode 370, an electrolyte 350 disposed between the cathode 370 and the anode 340 to provide an environment enabling ions to move, and a separator 360 to electrically insulate (isolate) the cathode 370 from the anode 340. Here, the ions that pass through the cathode 370 and the anode 340 are for example lithium ions. The separator 360 separates the cathode 370 from the anode 340 to prevent current charges generated at one electrode via the secondary battery 500 from moving to another electrode and then being unnecessarily consumed. Referring to FIG. 5, the separator 360 is disposed in the electrolyte 350.

The cathode 370 includes a cathode current collector 371 and a cathode active material layer 372. The cathode current collector 371 may be an aluminum foil.

The anode 340 includes an anode current collector 341 and an active material layer 342. The active material layer 342 of the anode 340 includes an anode active material.

The copper foils 100 and 200 shown in FIG. 1 or 2 may be used as the anode current collector 341. In addition, the electrodes 300 and 400 for secondary batteries shown in FIG. 3 or 4, respectively, may be used as the anode 340 of the secondary battery 500 shown in FIG. 5.

Figure 6:
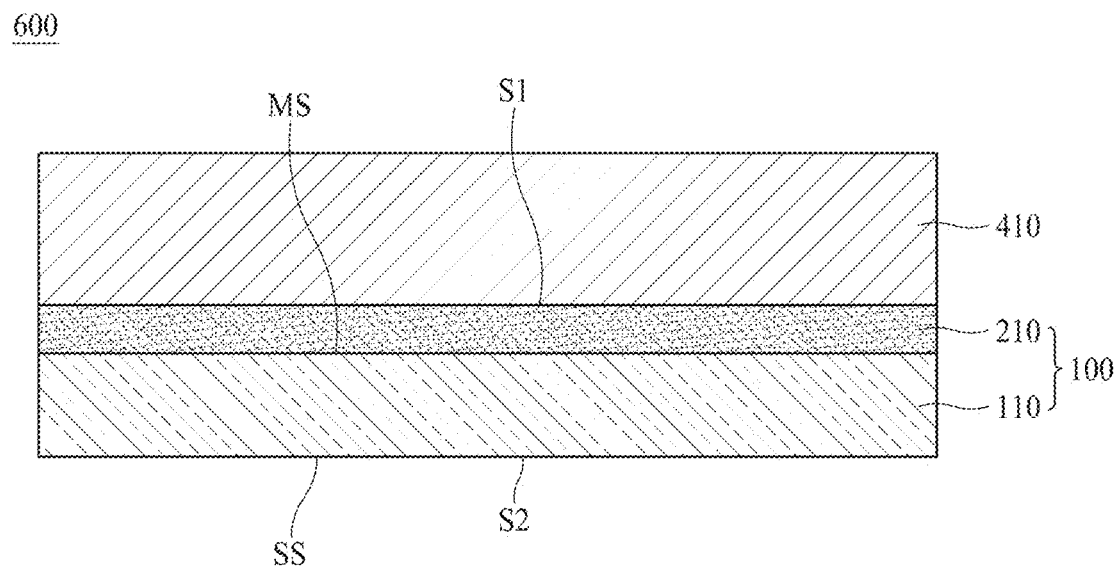
FIG. 6 is a sectional view illustrating a flexible copper foil laminate film according to another embodiment of the present disclosure.

FIG. 6 is a schematic sectional view illustrating a flexible copper foil laminate film 600 according to another embodiment of the present disclosure.

The flexible copper foil laminate film 600 according to another embodiment of the present disclosure includes a polymer membrane 410 and a copper foil 100 disposed on the polymer membrane 410. The flexible copper foil laminate film 600 including the copper foil 100 shown in FIG. 1 is illustrated in FIG. 6, but other embodiments of the present disclosure are not limited thereto. For example, the copper foil 200 shown in FIG. 2 or other copper foil may be used for the flexible copper foil laminate film 600.

The polymer membrane 410 is flexible and non-conductive. There is no particular limitation as to the kind of the polymer membrane 410. The polymer membrane 410, for example, includes polyimide.

For example, the flexible copper foil laminate film 600 can be produced by laminating a polyimide film and the copper foil 100 by a roll press. Alternatively, the flexible copper foil laminate film 600 can be produced by coating the copper foil 100 with a polyimide precursor solution and then heat-treating the resulting copper foil 100 as well.

The copper foil 100 has a copper layer 110 having a matte surface MS and a shiny surface SS, and an anticorrosive film 210 disposed on at least one of the matte surface MS and the shiny surface SS of the copper layer 110. In this case, the anticorrosive film 210 may be omitted.

Referring to FIG. 6, the polymer membrane 410 is disposed on the anticorrosive film 210, but the other embodiment of the present disclosure is not limited thereto. The polymer membrane 410 may be disposed on the shiny surface SS of the copper layer 110.

Hereinafter, a method for manufacturing a copper foil 200 according to another embodiment of the present disclosure will be described in detail with reference to FIG. 7.

FIG. 7 is a schematic view illustrating a method for manufacturing the copper foil 200 shown in FIG. 2.

First, a current density of 30 to 80 ASD (A/dm$^2$) is applied to a electrode plate 13 and a rotary electrode drum 12 spaced from each other in an electrolyte 11 containing copper ions to form a copper layer 110. The copper layer 110 is formed by electroplating. At this time, the gap between the electrode plate 13 and the rotary electrode drum 12 can be adjusted to the range of 8 to 13 mm.

When the current density applied to the electrode plate 13 and the rotary electrode drum 12 is less than 30 ASD, production of crystal grains is facilitated and, when the current density is higher than 80 ASD, crystal grains rapidly become finer.

The surface characteristics of the shiny surface SS of the copper layer 110 can be changed depending on the level of buffing or polishing of the surface of the rotary electrode drum 12. In order to control the dynamic friction coefficient (μk) and the ratio of three-dimensional surface area to two-dimensional surface area (Fs) of the surface of the direction of the shiny surface SS (second surface S2), for example, the surface of the rotary electrode drum 12 can be polished with a polishing brush having a grit of #1500 to #2500.

In the process of forming the copper layer 110, the electrolyte 11 is maintained at a temperature of 40 to 60° C.

Meanwhile, by controlling the composition of the electrolyte 11, surface characteristics of the matte surface MS of the copper layer 110 can be controlled. That is, by controlling the composition of the electrolyte 11, the dynamic friction coefficient (μk1) and the ratio of three-dimensional surface area to two-dimensional surface area (Fs1) of the first surface S1 of the copper foil 200 can be controlled.

According to one embodiment of the present invention, the electrolyte 11 includes 60 to 120 g/L of copper ions, 80 to 150 g/L of sulfuric acid, 50 mg/L or less of chlorine (Cl) and an organic additive.

In the electrolyte 11 having this composition and concentration, copper can be readily deposited on the rotary electrode drum 12.

According to one embodiment of the present invention, chlorine (Cl) includes chlorine ions (Cl$^-$) and chlorine atoms present in a molecule. Chlorine (Cl) can be, for example, used to remove silver (Ag) ions incorporated into the electrolyte 11 in the process of forming the copper layer 110. Specifically, chlorine (Cl) induces precipitation of silver (Ag) ions in the form of silver chloride (AgCl). The silver chloride (AgCl) can be removed by filtering.

In order to prevent unnecessary reaction by excessive chlorine (Cl), the concentration of chlorine (Cl) in the electrolyte 11 is adjusted to 50 mg/L or less.

The electrolyte 11 includes two or more organic additives. The organic additives may include at least one of ingredient A and ingredient B, and ingredient C.

Specifically, the organic additive includes at least one of 3 to 100 mg/L of ingredient A and 5 to 50 mg/L of ingredient B.

In addition, the organic additive includes 1 to 20 mg/L of ingredient C.

The ingredient A is sulfonic acid or a metal salt thereof. The ingredient A, for example, includes at least one selected from a bis-(3-sulfopropyl)-disulfide disodium salt (SPS), 3-mercapto-1-propanesulfonic acid, a 3-(N,N-dimethylthiocarbamoyl)-thiopropanesulfonate sodium salt, a 3-[(aminoiminomethyl)thio]-1-propanesulfonate sodium salt, an o-ethyldithiocarbonato-S-(3-sulfopropyl)-ester sodium salt, a 3-(benzothiazolyl-2-mercapto)-propyl-sulfonic acid sodium salt and an ethylenedithiodipropylsulfonic acid sodium salt.

The ingredient A can improve curl characteristics of high-strength copper foils as well as the luster of the copper foil 200. When the concentration of ingredient A is less than 3 mg/L, the luster of the copper foil 200 is deteriorated and, when the concentration of ingredient A is higher than 100 mg/L, the roughness of the copper foil 200 is increased and strength is deteriorated. More specifically, the ingredient A in the electrolyte 11 may have a concentration of 3 to 30 mg/L.

The ingredient B is a nonionic water-soluble polymer. The ingredient B, for example, includes at least one selected from polyethylene glycol (PEG), polypropylene glycol, a polyethylenepolypropylene copolymer, polyglycerin, polyethylene glycol dimethyl ether, hydroxyethylene cellulose, polyvinyl alcohol, stearic acid polyglycol ether and stearic alcohol polyglycol ether, but the type of ingredient B is not limited thereto and other nonionic water-soluble polymers useful for the high-strength copper foil 200 can be used.

The ingredient B prevents a rapid increase in roughness and a deterioration in strength of the copper foil 200.

When the concentration of ingredient B is less than 5 mg/L, disadvantageously, the roughness of the copper foil 200 or the copper layer 110 is rapidly improved and the strength of the copper foil 200 is deteriorated. Meanwhile, although the concentration of ingredient B is higher than 50 mg/L, as compared with the case wherein the concentration of ingredient B is 50 mg/L, there is almost no variation in physical properties such as appearance, luster, roughness, strength and elongation of the copper foil 200. Accordingly, without increasing manufacturing costs and wasting raw materials by unnecessarily increasing the concentration of ingredient B, the concentration of ingredient B can be adjusted to the range of 5 to 50 mg/L.

In addition, ingredient B has a molecular weight of 500 to 25,000. When the molecular weight of ingredient B is less than 500, the effects of ingredient B on preventing a rapid increase in roughness and a deterioration in strength of the copper foil 200 are insufficient and when the molecular weight of ingredient B is higher than 25,000, the copper layer 110 cannot be readily formed due to large molecular weight of ingredient B. More specifically, ingredient B may have a molecular weight of 1,000 to 10,000.

Ingredient C is a heterocyclic organic compound containing nitrogen (N) or sulfur (S). Ingredient C is particularly preferably a pyridine organic additive.

Ingredient C, for example, includes at least one selected from 2-mercaptobenzothiazole (2MBT), 3-(benzotriazole-2-mercapto)-pyrosulfuric acid, 2-mercaptopyridine, 3-(5-mercapto-1H-tetrazole)benzenesulfonate, 2-mercaptobenzothiazole, dimethylpyridine, 2,2'-bipyridine, 4,4'-bipyridine, pyrimidine, pyridazine, pyrinoline, oxazole, thiazole, 1-methylimidazole, 1-benzylimidazole, 1-methyl-2-methylimidazole, 1-benzyl-2-methylimidazole, 1-ethyl-4-methylimidazole, N-methylpyrrole, N-ethylpyrrole, N-butylpyrrole, N-methylpyrroline, N-ethylpyrroline, N-butylpyrroline, purine, quinoline, isoquinoline, N-methylcarbazole, N-ethylcarbazole and N-butylcarbazole.

Ingredient C can reduce occurrence of curl or wrinkle in the copper foil 200. When the concentration of ingredient C is less than 1 mg/L, the tensile strength of the copper foil 200 is deteriorated, which makes it difficult to produce high-strength copper foil 200. On the other hand, when the concentration of ingredient C is higher than 20 mg/L, the tensile strength of the copper foil 200 is increased, but the curl of the copper foil 200 becomes more serious.

The electrolyte 11 may be circulated at a flow rate of 35 to 45 m³/hour. That is, in order to remove solid impurities present in the electrolyte 11 during electroplating, the electrolyte 11 can be circulated at a flow rate of 35 to 45 m³/hour.

Then, the copper layer 110 is cleaned in a cleaning bath 20.

For example, acid cleaning to remove impurities, for example, resin ingredients or natural oxide on the surface of the copper layer 110 and water cleaning to remove the acidic solution used for acid cleaning may be sequentially conducted. The cleaning process may be omitted.

Then, anticorrosive films 210 and 220 are formed on the copper layer 110.

Referring to FIG. 7, the copper layer 110 is dipped in an anticorrosive liquid 31 contained in the anticorrosion bath 30, to form anticorrosive films 210 and 220 on the copper layer 110. Here, the anticorrosive liquid 31 includes chromium and chromium (Cr) is present in the form of an ion in the anticorrosive liquid 31.

The anticorrosive liquid 31 may include 0.5 to 5 g/L of chromium. To form the anticorrosive films 210 and 220, the temperature of the anticorrosive solution 31 can be maintained at 20 to 40° C. The anticorrosive films 210 and 220 thus formed are referred to as "protective layers".

Meanwhile, the anticorrosive films 210 and 220 may include a silane compound via treatment with silane and a nitrogen compound via treatment with nitrogen.

The copper foil 200 is produced by formation of these anticorrosive films 210 and 220.

Then, the copper foil 200 is cleaned in a cleaning bath 40. Such a cleaning process may be omitted.

Then, a drying process is preformed and the copper foil 200 is then wound on a winder (WR).

Hereinafter, the present disclosure will be described in more detail with reference to Preparation Examples and Comparative Examples. The Preparation examples and Comparative Examples are only provided only for better understanding of the present disclosure and should not be construed as limiting the scope of the present disclosure.

Preparation Examples 1-5 and Comparative Examples 1-6

A copper foil was produced using a foil making machine which includes an electrolytic bath 10, a rotary electrode drum 12 disposed in the electrolytic bath 10, and a electrode plate 13 spaced from the rotary electrode drum 12. The electrolyte 11 was a copper sulfate solution, the copper ion concentration of the electrolyte 11 was 80 g/L, a sulfuric acid concentration was 100 g/L, a chlorine concentration was 20 mg/L, and the temperature of the electrolyte 11 was maintained at 55° C.

The organic additives contained in the electrolyte 11 were a bis-(3-sulfopropyl)-disulfide disodium salt (SPS, ingredient A), polyethylene glycol (PEG, ingredient B) and 2-mercaptobenzothiazole (2MBT, ingredient C). The contents of them are shown in Table 1.

The rotary electrode drum 12 was polished and buffed with a buffing brush for drum polishing with a roughness of #2000. By applying the same polishing and buffing conditions to Preparation Examples 1-5 and Comparative Examples 1-6, substantially equal dynamic friction coefficient and ratio of three-dimensional surface area to two-dimensional surface area were imparted to the second surface S1 of the copper foil disposed in the direction of the shiny surface SS of the copper layer 110 of Preparation Examples 1-5 and Comparative Examples 1-6.

First, a current density of 50 ASD (A/dm²) was applied between the rotary electrode drum 12 and the electrode plate 13 to form a copper layer 110. Then, the copper layer 110 was cleaned in a cleaning bath 20. Then, the copper layer 110 was dipped in the anticorrosive liquid 31 contained in the anticorrosion bath 30 to form anticorrosive films 210 and 220 including chromium on the surface of the copper layer 110. At this time, the temperature of the anticorrosive liquid 31 was maintained at 30° C. and the anticorrosive liquid 31 included 2.2 g/L of chromium (Cr). As a result, copper foils according to Preparation Examples 1-5 and Comparative Examples 1-6 were produced.

The thickness of the produced copper foil was 6 μm.

TABLE 1

| | Concentration of additive (mg/L) | | |
|---|---|---|---|
| | SPS (Ingredient A) | PEG (Ingredient B) | 2MBT (Ingredient C) |
| Preparation Example 1 | 3 | 5 | 5 |
| Preparation Example 2 | 7 | — | 10 |
| Preparation Example 3 | 10 | 10 | 3 |
| Preparation Example 4 | 5 | 7 | 7 |
| Preparation Example 5 | — | 5 | 5 |
| Comparative Example 1 | 10 | — | — |
| Comparative Example 2 | — | 10 | — |
| Comparative Example 3 | 20 | 20 | — |
| Comparative Example 4 | — | — | 5 |
| Comparative Example 5 | 5 | — | 25 |
| Comparative Example 6 | — | 5 | 25 |

(i) Dynamic friction coefficient, (ii) ratio of three-dimensional surface area to two-dimensional surface area, (iii) tensile strength of the copper foils according to Preparation Examples 1-5 and Comparative Examples 1-6 thus produced were measured and (iv) whether or not wrinkles occurred was observed. In addition, a secondary battery was produced using a copper foil and (v) capacity maintenance rate thereof was evaluated.

(i) Dynamic Friction Coefficient

The dynamic friction coefficients of the first surface S1 and the second surface S2 of the copper foils produced in Preparation Examples 1-5 and Comparative Examples 1-6 were measured using Tribogear 14FW available from Haydon Corporation, Inc. in accordance with the regulations of ASTM D1894. Specifically, a stainless steel ball (SUS ball) was brought into contact with the copper foil 100 and they were mutually moved while a load was applied to the stainless steel (SUS) ball, so that the dynamic friction coefficient of the copper foil 100 was measured. In this case, the dynamic friction coefficient of the copper foil 100 was measured at a rate of 100 mm/min using a 10 mm (diameter) stainless steel ball (SUS ball) at a measurement distance of 10 mm and an applied load of 100 g. The dynamic friction coefficient was measured three times and the mean thereof is shown in Table 2.

(ii) Ratio of Three-Dimensional Surface Area to Two-Dimensional Surface Area

The ratio of three-dimensional surface area to two-dimensional surface area (Fs) was measured using a VK-9710 available from Keyence Corporation. Specifically, the copper foil 100 was cut to a size of 1 cm×1 cm to produce a sample and the copper foil sample was observed at a magnification of 50× using a VK-9710, as a color 3D laser microscope, available from Keyence Corporation to measure a three-dimensional surface area. The ratio of three-dimensional surface area to two-dimensional surface area (Fs) corresponds to a value obtained by dividing a three-dimensional surface area of the corresponding copper foil sample three-dimensionally measured by a two-dimensional planar surface area (1 cm$^2$) of the corresponding copper foil sample (see Equation 5). Here, the three-dimensional surface area is an area obtained by moving a lens of the microscope along the Z-axis and adjusting the focus.

Figure 8A:
FIG. 8A is a three-dimensional surface image showing a first surface S1 of the copper foil according to Preparation Example 1 and FIG. 8B is a three-dimensional surface image showing the second surface S2 of the copper foil.
Figure 8B:
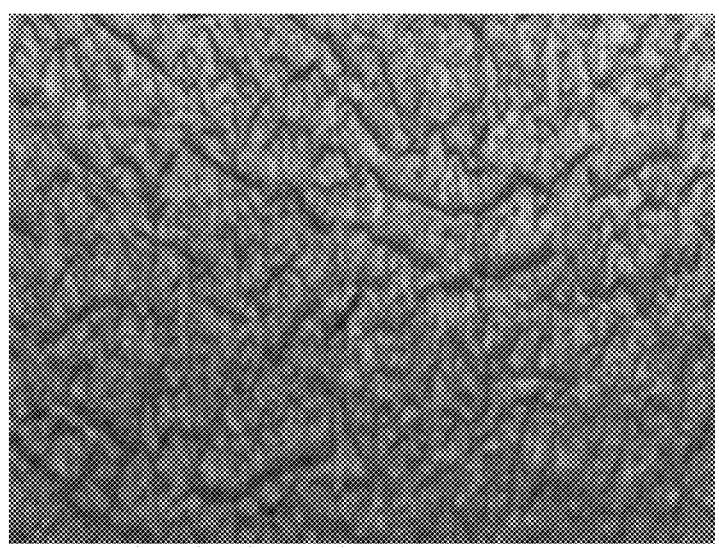

FIG. 8A is a three-dimensional surface image showing the first surface S1 of the copper foil according to Preparation Example 1 and FIG. 8B is a three-dimensional surface image showing the second surface S2.

The ratio of three-dimensional surface area to two-dimensional surface area (Fs) can be obtained by the following Equation 5:

$$Fs = \text{(three-dimensional surface area of sample)}/\text{(two-dimensional surface area of sample)} \quad \text{[Equation 5]}$$

(iii) Tensile Strength

Tensile strength was measured using a universal testing machine in accordance with the specifications of the IPC-TM-650 test method manual. Specifically, tensile strength is measured with a universal testing machine available from Instron corporation. The width of the measurement sample of tensile strength was 12.7 mm, the distance between grips was 50 mm and the measurement speed was 50 mm/min.

(Iv) Occurrence of Wrinkle

Figure 9:
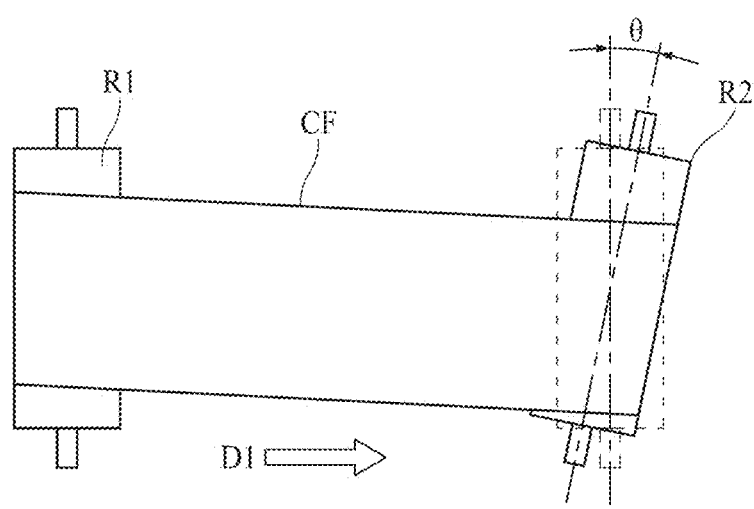
FIG. 9 is a schematic view illustrating a wrinkle test.

FIG. 9 is a schematic view illustrating a wrinkle test.

As shown in FIG. 9, copper foils CF of Preparation Examples 1-5 and Comparative Examples 1-6 were hung on a first roll R1 and a second roll R2, misalignment was intentionally formed at an angle (θ) of 1.5° on the second roll, and whether or not wrinkles occurred was observed when the copper foil was moved in direction Dl. In Table 2, a case wherein wrinkles occur is designated by "◯" and a case wherein wrinkles do not occur is designated by "X".

(v) Evaluation of Capacity Maintenance Rate

1) Anode Production 100 parts by weight of a commercially available silicon/carbon composite anode material for an anode active material was mixed with 2 parts by weight of styrene butadiene rubber (SBR) and 2 parts by weight of carboxymethyl cellulose (CMC), and a slurry for an anode active material was prepared using distilled water as a solvent. Copper foils with a width of 10 cm produced in Preparation Examples 1-5 and Comparative Examples 1-6 were coated to a thickness of 40 μm with the slurry for an anode active material using a doctor blade, dried at 120° C. and pressed at a pressure of 1 ton/cm$^2$ to produce an anode for secondary batteries.

2) Electrolyte Production

LiPF$_6$ as a solute was dissolved at a concentration of 1M in a non-aqueous organic solvent consisting of ethylene carbonate (EC) and ethyl methyl carbonate (EMC) mixed in a ratio of 1:2 to prepare a basic electrolyte. 99.5% by weight of the basic electrolyte was mixed with 0.5% by weight of succinic anhydride to prepare a non-aqueous electrolyte.

3) Cathode Production

Lithium manganese oxide (Li$_{1.1}$Mn$_{1.85}$Al$_{0.05}$O$_4$) was mixed with lithium manganese oxide (o-LiMnO$_2$) having an orthorhombic crystal structure in a weight ratio of 90:10 to produce a cathode active material. The cathode active material, carbon black, and PVDF [poly(vinylidene fluoride)] as a binder were mixed in a weight ratio of 85:10:5, and the resulting mixture was mixed with NMP as an organic solvent to prepare a slurry. Both surfaces of an Aluminum (Al) foil with a thickness of 20 μm were coated with the slurry thus prepared and dried to produce a cathode.

4) Production of Lithium Secondary Battery for Testing

The cathode and the anode were disposed in an aluminum can such that the cathode and the anode were insulated with the aluminum can, and a non-aqueous electrolyte and a separator were disposed to produce a coin-type lithium secondary battery. The used separator was polypropylene (Celgard 2325; thickness 25 μm, average pore size φ28 nm, porosity 40%).

5) Measurement of Capacity Maintenance Rate

The lithium secondary battery thus produced was operated at a charge voltage of 4.3V and a discharge voltage of 3.4V and the capacity per gram of the anode was measured. Then, charge-discharge testing was conducted 500 cycles at a high temperature of 50° C. at a current rate (C-rate) of 0.2 and capacity maintenance rate was calculated. When the capacity maintenance rate was 90% or less, it was determined that the copper foil was unsuitable for an anode current collector for lithium ion batteries.

The capacity maintenance rate was calculated by the following Equation 6.

Capacity maintenance rate (%)=[(capacity after 500 charge/discharge cycles)/(capacity after one charge/discharge cycle)]×100    [Equation 6]

The test results are shown in Table 2.

0.5 and the difference in dynamic friction coefficient between the first surface S1 and the second surface S2 was higher than 0.2. Accordingly, the copper foil was wrinkled. In addition, the capacity maintenance rate of the secondary battery was deteriorated due to great difference in Fs between the first surface S1 and the second surface.

In Comparative Example 3, dynamic friction coefficient characteristics were good, but the Fs of the first surface S1 of the copper foil was less than 4.0, and the difference in Fs between the first surface S1 and the second surface was higher than 2. Accordingly, the capacity maintenance rate of the secondary battery was deteriorated.

In addition, in Comparative Examples 1 to 3, since 2MBT, the ingredient C of the organic additive was not used, the copper foil had a decreased and insufficient tensile strength of less than 40 kgf/mm².

TABLE 2

| | Dynamic friction coefficient | | | Fs | | | Tensile strength (kgf/mm²) | Capacity maintenance rate (%) | Occurrence of wrinkle |
|---|---|---|---|---|---|---|---|---|---|
| | First surface | Second surface | Difference | First surface | Second surface | Difference | | | |
| Preparation Example 1 | 0.46 | 0.32 | 0.15 | 5.1 | 5.7 | 0.6 | 46 | 93 | X |
| Preparation Example 2 | 0.41 | 0.33 | 0.06 | 6.5 | 5.7 | 1.2 | 55 | 91 | X |
| Preparation Example 3 | 0.45 | 0.33 | 0.12 | 5.7 | 5.8 | 0.1 | 43 | 91 | X |
| Preparation Example 4 | 0.49 | 0.32 | 0.17 | 4.0 | 5.8 | 1.8 | 48 | 90 | X |
| Preparation Example 5 | 0.42 | 0.32 | 0.10 | 4.3 | 5.7 | 1.4 | 47 | 91 | X |
| Comparative Example 1 | 0.36 | 0.33 | 0.03 | 2.0 | 5.7 | 3.7 | 32 | 80 | ○ |
| Comparative Example 2 | 0.55 | 0.33 | 0.22 | 2.3 | 5.8 | 3.5 | 34 | 79 | ○ |
| Comparative Example 3 | 0.46 | 0.33 | 0.13 | 3.5 | 5.7 | 2.2 | 33 | 82 | X |
| Comparative Example 4 | 0.38 | 0.32 | 0.06 | 6.1 | 5.7 | 0.4 | 46 | 91 | ○ |
| Comparative Example 5 | 0.32 | 0.33 | 0.01 | 6.3 | 5.7 | 0.6 | 61 | 90 | ○ |
| Comparative Example 6 | 0.31 | 0.33 | 0.02 | 6.2 | 5.8 | 0.4 | 60 | 91 | ○ |

As can be seen from Table 2, the copper foils according to Preparation Examples 1-5 had a dynamic friction coefficient of the first surface S1, of 0.4 to 0.5 and had a difference in dynamic friction coefficient between the first surface S1 and the second surface S2, of 0.2 or less, so that slip did not almost occur and thus wrinkles did not occur in the copper foil. In addition, the ratio of three-dimensional surface area to two-dimensional surface area (hereinafter, referred to as "Fs") of the first surface S1 according to Preparation Examples 1-5 was 4.0 to 6.5 and the difference in Fs between the first surface S1 and the second surface S2 was 2.0 or less. Accordingly, the secondary battery produced using the copper foil exhibited excellent capacity maintenance rate of 90% or more.

In Comparative Example 1, the difference in dynamic friction coefficient between the first surface S1 and the second surface S2 was 0.2 or less, but the dynamic friction coefficient of the first surface S1 was less than 0.4. Accordingly, the copper foil was wrinkled. In addition, the Fs of the first surface S1 was less than 4.0 and the difference in Fs between the first surface S1 and the second surface was higher than 2. Accordingly, capacity maintenance rate was deteriorated.

In Comparative Example 2, the dynamic friction coefficient of the first surface S1 of the copper foil was higher than Secondary batteries using metal-based active materials for high capacity require high-strength electrolytic copper foils, because they are severely volumetrically expanded upon charge/discharge. However, the copper foils of Comparative Examples 1 to 3 failed to satisfy these requirements.

In Comparative Example 4, only ingredient C, 2MBT was used as an organic additive and the copper foil satisfied Fs requirements. Accordingly, the copper foil imparted excellent capacity maintenance rate to the secondary battery and had a tensile strength of 40 kgf/mm² or more, but had a dynamic friction coefficient of the first surface S1, of less than 0.4. Accordingly, the copper foil was wrinkled.

In Comparative Examples 5 and 6, ingredient C, 2MBT, was excessively used as an organic additive. In this case, the capacity maintenance rate of the secondary battery and the tensile strength of the copper foil were excellent, but the dynamic friction coefficient of the first surface S1 of the copper foil was less than 0.4 and the copper foil was thus wrinkled.

According to the embodiments of the present disclosure, in the process of manufacturing a copper foil, it is possible to prevent occurrence of slip as well as occurrence of wrinkle or tear in the copper foil. Accordingly, the copper foil according to another embodiment of the present disclosure has excellent roll-to-roll (RTR) processability, workability or handleability.

In addition, according to another embodiment of the present disclosure, the dynamic friction coefficient and surface area ratio of the matte surface direction can be controlled by controlling an additive in the process of producing the copper foil, and the dynamic friction coefficient and surface area ratio of the shiny surface direction can be controlled by controlling the roughness of a buffing brush, so that a difference in surface area ratio between the two surfaces can be controlled.

According to another embodiment of the present disclosure, by controlling the dynamic friction coefficient and surface area ratio of the copper foil, workability of the copper foil can be improved and charge/discharge characteristics of the secondary battery produced using the copper foil can be enhanced.

It will be apparent to those skilled in the art that the present disclosure described above is not limited by the above-described embodiments and the accompanying drawings and that various substitutions, modifications, and variations can be made in the present disclosure without departing from the spirit and scope of the disclosures. Consequently, the scope of the present disclosure is defined by the accompanying claims, and it is intended that all variations and modifications derived from the meaning, scope, and equivalent concept of the claims fall within the scope of the present disclosure.

What is claimed is:

1. A copper foil comprising a copper layer having a matte surface and a shiny surface, wherein the copper foil has a first surface of a direction of the matte surface of the copper layer and a second surface of a direction of the shiny surface of the copper layer, wherein a dynamic friction coefficient of the first surface is designated by $\mu k1$ and a dynamic friction coefficient of the second surface is designated by $\mu k2$, and $\mu k1$ and $\mu k2$ satisfy the following Equations 1 and 2:

$$0.4 \leq \mu k1 \leq 0.5 \qquad \text{[Equation 1]}$$

$$|\mu k1 - \mu k2| \leq 0.2, \text{ and} \qquad \text{[Equation 2]}$$

wherein a ratio of three-dimensional surface area to two-dimensional surface area of the first surface is designated by Fs1, a ratio of three-dimensional surface area to two-dimensional surface area of the second surface is designated by Fs2, and Fs1 and Fs2 satisfy the following Equations 3 and 4:

$$4.0 \leq Fs1 \leq 6.5 \qquad \text{[Equation 3]}$$

$$|Fs1 - Fs2| \leq 2.0. \qquad \text{[Equation 4]}$$

2. The copper foil according to claim 1, wherein the copper foil has a tensile strength of 40 kgf/mm$^2$ or more at room temperature.

3. The copper foil according to claim 1, wherein the copper foil has a thickness of 4 μm to 35 μm.

4. The copper foil according to claim 1, further comprising an anticorrosive film disposed on the copper layer.

5. The copper foil according to claim 1, wherein the anticorrosive film comprises at least one of chromium (Cr), a silane compound or a nitrogen compound.

6. An electrode for secondary batteries comprising:

the copper foil according to claim 1; and an active material layer disposed on the copper foil.

7. A secondary battery comprising:

a cathode;

an anode facing the cathode;

an electrolyte disposed between the cathode and the anode to provide an environment enabling lithium ions to move; and a separator to electrically insulate (isolate) the cathode from the anode, wherein the anode comprises:

the copper foil according to claim 1; and an active material layer disposed on the copper foil.

8. A flexible copper foil laminate film comprising:

a polymer membrane; and the copper foil according to claim 1 disposed on the polymer membrane.

* * * * *